United States Patent [19]
Kotaki

[11] Patent Number: 6,139,309
[45] Date of Patent: Oct. 31, 2000

[54] INJECTION MOLDING APPARATUS

[75] Inventor: Daizo Kotaki, Ashikaga, Japan

[73] Assignee: Daisan Kanagata Seisakusyo Ltd., Ashikaga, Japan

[21] Appl. No.: 09/183,221

[22] Filed: Oct. 29, 1998

[30] Foreign Application Priority Data

Oct. 29, 1997 [JP] Japan ................................. 9-336269

[51] Int. Cl.$^7$ ................................................ B29C 45/03
[52] U.S. Cl. ........................ 425/542; 249/60; 264/328.12
[58] Field of Search ........................ 249/60; 264/328.12; 425/568, 542

[56] References Cited

U.S. PATENT DOCUMENTS 5,423,893  6/1995  Kotaki ........................................ 55/511

Primary Examiner—Tim Heitbrink
Attorney, Agent, or Firm—Dellett and Walters

[57] ABSTRACT

An injection molding apparatus for molding a plastic article by fitting an upper mold and a lower mold by pressing and injecting a molten resin through a pin point gate employs a net groove formed at the upper mold and/or the lower mold, said net groove comprising fine grooves extending in a vertical and/or horizontal directions. A passage groove formed on the net groove of the upper and/or lower molds has a large diameter or width to facilitate the entrance of the molten resin. At least one pin point gate is formed on the passage groove to inject the molten resin into the mold. A frame groove surrounds the net groove in the upper and/or lower molds.

11 Claims, 10 Drawing Sheets

INJECTION MOLDING APPARATUS

BACKGROUND OF THE INVENTION

1. Field of the Invention

The present invention relates to molds and molded articles for forming molded plastic articles which can be used as an oil or air filter used in a car or electronic equipment, a filter used in daily necessities including kitchen utensils and articles used in a bathroom or a toilet, and various filters used for straining, draining and other various purposes, and more particularly, to a molding apparatus which is suitable for molding a fine net filter.

2. Description of Related Art

Conventionally, molded plastic articles such as a net plastic filter having a frame were produced by an insert molding instead of an one-piece molding in order to avoid difficulties in molding. However, the insert molding demands too many processes and high cost. In performing the insert molding, bonding of a meshed net to the frame is important. This reduces the yield. Thus, strict test processes are required. Attempts at one-piece molding encountered the following drawbacks.

(1) If molten resin is injected into net rib grooves at a low injection pressure, the molten resin can not reach to the end of the grooves due to lack of injection pressure and it is likely that there would be some of the net ribs missing or some parts of the plate distorted especially at distant locations from a gate.

(2) If a high pressure injection is applied, there would be no ribs missing or plate distortion. But, in the case of net ribs, the space between the ribs would be closed, resulting in the possibility of failing to serve as a filter or a net. Further, regulation of the pressure is complicated. If the molten resin flows into a mold within the range of a diameter of a gate of 0.8 to 0.2 $\phi$, the resin is compelled to flow into latticed grooves that are too fine. In this case, the following drawbacks are caused.

(3) To improve flowability, it is necessary to increase the temperature of the molten resin. Thus, since gas or air produced from hot molten resin might stay within the mold, the molten resin could not uniformly reach to the end of the fine grooves even under the sufficiently high injection pressure.

(4) Further, to improve flowability, it is necessary to make the injection pressure higher. This requires a large-sized molding apparatus. It is impossible for a low cost molding apparatus to be employed.

(5) Further, since it is necessary to increase the temperature of the resin to improve flowability, it is necessary to employ a hot runner of high cost and significantly increase the temperature of the mold.

In order to solve the drawbacks (1) to (5), the applicant of this invention has already suggested an improved plastic filter having a guide or an improved mold having a guide groove in the following: Japanese Patent Publication No. Hei 7(1995)-20677, Japanese Non-examined Patent Publication Nos. Hei 6(1994)-126784, 6(1994)-15531, 7(1995)-52164, 7(1995)-137166 and 7(1995)-284617.

However, further study is necessary to obtain perfectly molded articles having good plasticity and yield without any defect such as burrs or welds.

Therefore, it is intended in the present invention that a diameter of a gate, which is typically 0.8 to 1.5 $\phi$ in performing molding in a pin point gate, is 1.5 $\phi$ or more for low injection pressure and high temperature of the molten resin with halting gas or air. If the diameter of the pin point gate becomes large, a gate cut is essentially required. For this reason, the diameter should be maintained within the range of 1.2 $\phi$. However, since the temperature difference between a gate part and a molded article part is large in net articles in which the molded article part is not likely to regenerate, a net filter does not require the gate cut even if the diameter of the gate becomes larger.

In the prior art, there is a direct gate method used for molding a plastic basket or a thin frame box article in the case of a gate having a large diameter. However, this direct gate method requires a gate cut process later.

There are a number of problems to be solved in injection molding of an article having a fine-pitch net structure, for example a filter for air conditioner or oil filter, by the one-piece molding:

(1) providing a mold structure which can provide generally uniform flow of the molten resin.

(2) providing a mold structure which can improve flowability of the molten resin.

(3) providing a mold structure which can improve flowability of the molten resin and can prevent missing ribs at the point to which the molten resin has difficulty reaching or moldings defect in the thick portions.

SUMMARY OF THE INVENTION

Accordingly, the present invention is directed to molds and molded articles that substantially obviate one or more of the problems due to limitations and disadvantages of the related art.

An object of the present invention is to provide molds and molded articles which can provide low pressure molding and prevent missing ribs at the point to which molten resin has difficulty reaching or molding defect in the thick portions.

Another object of the present invention is to provide molds and molded articles which do not require separate gate cut processes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, according to a first aspect of the invention, an injection molding apparatus for molding a plastic article by fitting an upper mold and a lower mold by pressing and injecting a molten resin through a pin point gate, includes:

(a) a net groove formed at the upper mold and/or the lower mold, said net groove comprising fine grooves extending in a vertical and/or horizontal directions;

(b) a passage groove having a large diameter or a large width, for facilitating the entrance of the molten resin, the passage groove being formed on the net groove of the upper mold and/or the lower mold;

(c) at least one pin point gate formed on the passage groove to inject the molten resin into the mold, having a diameter of 1.5 $\phi$ or more to be suitable for the shape or size of the plastic article; and (d) a frame groove formed to surround the net groove in the upper mold and/or the lower mold.

According to another aspect of the injection molding apparatus, the passage groove has a cross shape s and the pin point gate is formed on a crossing point of the passage groove.

According to a further aspect of the injection molding apparatus, the passage groove has the diameter or width relative to the diameter of the pin point gate.

According to another aspect of the injection molding apparatus, the passage groove is formed as a guide groove having a large diameter or a large width, both ends of which are not directly connected to the frame groove, in order that the molten resin injected into the mold through the pin point gate can enter into the fine groove after the pressure of the molten resin is accumulated.

According to a further aspect of the injection molding apparatus, a band-shaped groove having a large diameter or a large width is formed in a direction intersecting the guide groove, in order that the molten resin injected into the mold through the gate can enter into the net groove in a wide range after the pressure of the molten resin is accumulated.

According to a further aspect of the injection molding apparatus, at least one bypass wall groove is formed on the frame groove of the upper mold and/or the lower mold to oppose the passage groove, in order that the flow of the molten resin from the passage groove can be bypassed.

According to yet another aspect, an injection molding apparatus for molding a plastic article by fitting an upper mold and a lower mold by pressing and injecting a molten resin through a gate, includes:

(a) a net groove formed at the upper mold and/or the lower mold, said net groove comprising fine grooves extending in a vertical and/or horizontal directions;

(b) a passage groove having a large diameter or a large width, for facilitating the entrance of the molten resin, the passage groove being formed on the net groove of the upper mold and/or the lower mold;

(c) at least one gate formed on the passage groove, for injecting the molten resin into the mold;

(d) a frame groove formed to surround the net groove in the upper mold and/or the lower mold; and (e) a band-shaped groove protrudes to communicate with the frame groove in a direction toward the gate from the frame groove, the depth of which being gradually formed to be low toward the center of the mold.

According to a further aspect, an injection molding apparatus for molding a plastic article by fitting an upper mold and a lower mold by pressing and injecting a molten resin through a gate, includes:

(a) a net groove formed at the upper mold and/or the lower mold, said net groove comprising fine grooves extending in a vertical and/or horizontal directions;

(b) a passage groove having a large diameter or a large width, for facilitating the entrance of the molten resin, the passage groove being formed on the net groove of the upper mold and/or the lower mold;

(c) at least one gate formed on the passage groove, for injecting the molten resin into the mold;

(d) a frame groove formed to surround the net groove in the upper mold and/or the lower mold; and (e) a plurality of guide grooves having a large diameter or a large width, both ends of which are not directly connected to the frame groove, formed in rectangular or cross-rectangular direction, in order that the molten resin injected into the mold through the gate can enter into the fine groove after the pressure of the molten resin is accumulated.

According to still another aspect, an injection molding apparatus for molding a plastic article by fitting an upper mold and a lower mold by pressing and injecting a molten resin through a gate, includes:

(a) a net groove formed at the upper mold and/or the lower mold said net groove comprising fine grooves extending in a vertical and/or horizontal directions;

(b) a passage groove having a large diameter or a large width, for facilitating the entrance of the molten resin, the passage groove being formed only in one direction on the net groove of the upper mold and/or the lower mold;

(c) at least one gate formed on the passage groove, for injecting the molten resin into the mold; and (d) a frame groove formed to surround the net groove in the upper mold and/or the lower mold.

According to a different aspect, an injection molding apparatus for molding a plastic article by fitting an upper mold and a lower mold by pressing and injecting a molten resin through a gate, includes:

(a) a net groove formed at the upper mold and/or the lower mold, said net groove comprising fine grooves extending in a vertical and/or horizontal directions;

(b) a passage groove having a large diameter or a large width, for facilitating the entrance of the molten resin, the passage groove being formed on the net groove of the upper mold and/or the lower mold;

(c) at least one gate formed on the passage groove, for injecting the molten resin into the mold; and (d) a frame groove formed to surround the net groove in the upper mold and/or the lower mold.

According to a further aspect of the injection molding apparatus, the gate formed to be slightly apart from the crossing point of the passage groove is formed on the passage groove close to the frame groove.

In addition, molded articles are provided, formed by the injection molding apparatus.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1A:
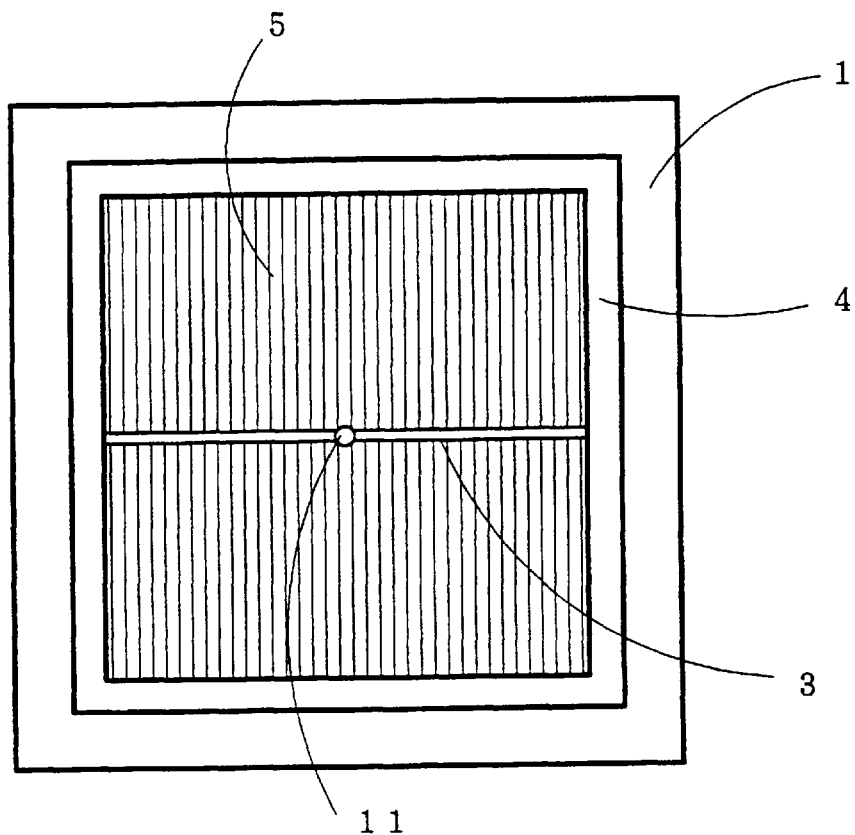
FIGS. 1a and 1b show a plane view and a sectional view of the injection mold according to the present invention.

FIG. 1 shows one embodiment of a mold of a plastic filter having a net structure according to the present invention. FIG. 1a shows a plane view of the mold for a plastic according to the present invention. Referring to FIG. 1, an upper mold 1 includes fine grooves 5 extended only in a vertical direction and a frame groove 4 surrounding the fine grooves 5. A passage groove 3 having a large diameter, for promoting flow of a molten resin is formed in a direction intersecting the fine grooves 5 in the middle of the fine grooves 5. A pin point gate 11 is formed at the center of the passage groove 3, through which the molten resin is injected into the mold.

The molten resin entering into the passage groove 3 through the pin point gate 11 flows toward the frame groove 4 and at the same time flows into the fine grooves 5 formed at both sides of the passage groove 3, so that the molten resin becomes a striped net filter having a frame.

Since the fine grooves 5 are formed only in one direction, flows of the molten resin in the mold do not come into collision with one another between the fine grooves, and flowability of the molten resin can be improved. Further, since the diameter of the pin point gate 11 is large, low pressure molding can be achieved. In the present invention, it is not necessary to increase the temperature of the molten resin or the injection pressure as compared to the conventional mold having a large load, which requires high temperature of the molten resin and high injection pressure.

Figure 1B:
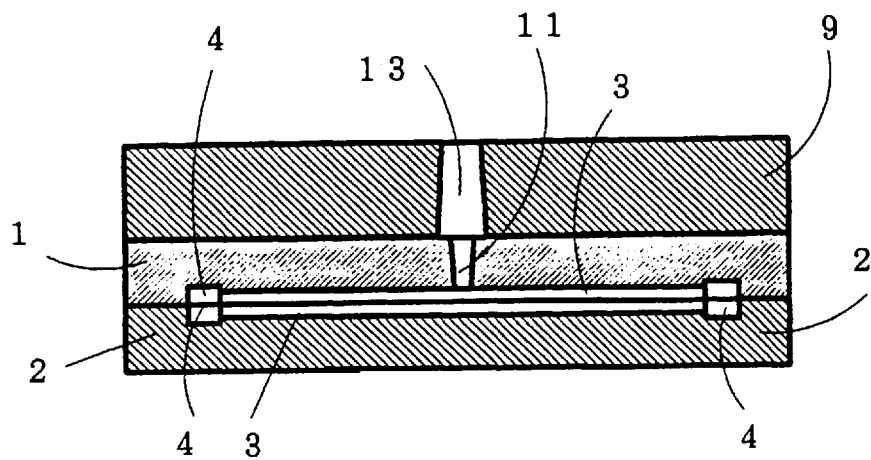

FIG. 1b shows a sectional view when the upper mold 1 and the lower mold 2 are fitted by pressure. Referring to FIG. 1b, the passage grooves 3 are opposed to each other. However, it is possible that only one passage groove 3 may be formed in the upper mold 1 or the lower mold 2, according to the kind of the article to be molded. A mold 9 and a spool 13 are formed at an upper portion of the upper mold 1. Reference numeral 4 denotes a frame groove.

Since the passage groove 3 and the fine grooves 5 are symmetrically formed and fitted together by pressing in one direction in the upper mold 1 and the lower mold 2, flows of the molten resin do not come into collision with one another between the grooves, and the molten resin can smoothly flow. As a result, mass production of molded articles having a large area or of molded articles composed of a fine net becomes possible with good yield even in the case of low injection pressure.

Through testing according to the present invention, it was found that the injection pressure of about 80 kg was sufficient for producing a latticed net filter having 200 angles or 110 angles. According to conventional technology, injection pressure of about 100 kg or more was required for the same result. And, it was found that the molds could be fitted with a smaller fitting power of 100 ton or less in comparison with the conventional case, in which the relative large fitting power of about 200 ton was required. Also, the molds can be fitted by pressing in one direction. Thus, the frames can easily be separated unlike the latticed grooves, and small numbers of frames can be raised, so that an article having a fine net can be molded in a short time.

Further, in the present invention, since the diameter of the pin point gate 11 is large, a molded filter having no burrs or missing ribs can be obtained by the following test results, even in the case of a net having 60 to 100 mesh in a large-sized plastic filter having 300 angles.

In the present invention, although the mesh type net having a latticed groove (which requires strict molding conditions) was used instead of a striped net, it was found that it is possible to satisfactorily mold an article by a typical low cost molding apparatus. This means that it is possible to mold an article at low pressure injection, with low temperature molten resin, and low fitting power.

Furthermore, air or gas generated in the mold exhausts from a frame fitting side of the mold, so that missing ribs do not occur.

| diameter of gate | injection pressure | temperature of mold | fitting power | molded article | line diameter |
|---|---|---|---|---|---|
| In case of a latticed net (mesh) | | | | | |
| 1.5 φ | 41 kgf | 45 ° | 180 t | 300 | 0.35 |
| 2.0 φ | 42 kgf | 45 ° | 180 t | angles | |
| 2.3 φ | 38 kgf | 40 ° | 160 t | | |
| In case of a striped net | | | | | |
| 1.5 φ | 40 kgf | | 160 t | 300 | 0.35 |
|  | 44 kgf | 40 ° | 180 t | angles | |
| 2.3 φ | 37 kgf | | 110 t | | |

The reason why the diameter of the pin point gate should be within the range of 0.8 to 1.2 φ is that a gate cut is needed as later process after molding in an article having no temperature difference between the gate part and the molding part. However, in case of a fine net filter according to the present invention, since the molding part is fine, cooling is fast so that temperature difference between the molding part and the gate part (in which cooling is relatively slow) is caused, thereby causing a large shearing force.

If the diameter of the pin point gate becomes large, low pressure molding becomes possible. However, since a gate cut is essentially required, the conventional technology has not considered that the diameter of the pin point gate should be enlarged. Also, even if the diameter of the pin point gate becomes large, it is difficult to perform low pressure molding unless the mold is improved as described below. In this respect, it was difficult to manufacture the fine net filter according to the present invention. The existing one-piece net filter has a line diameter of 1 mm or less. In the case of a line diameter having 1 mm or more, there is only an article employing insert molding of woven cloth into a plastic frame.

Figure 2A:
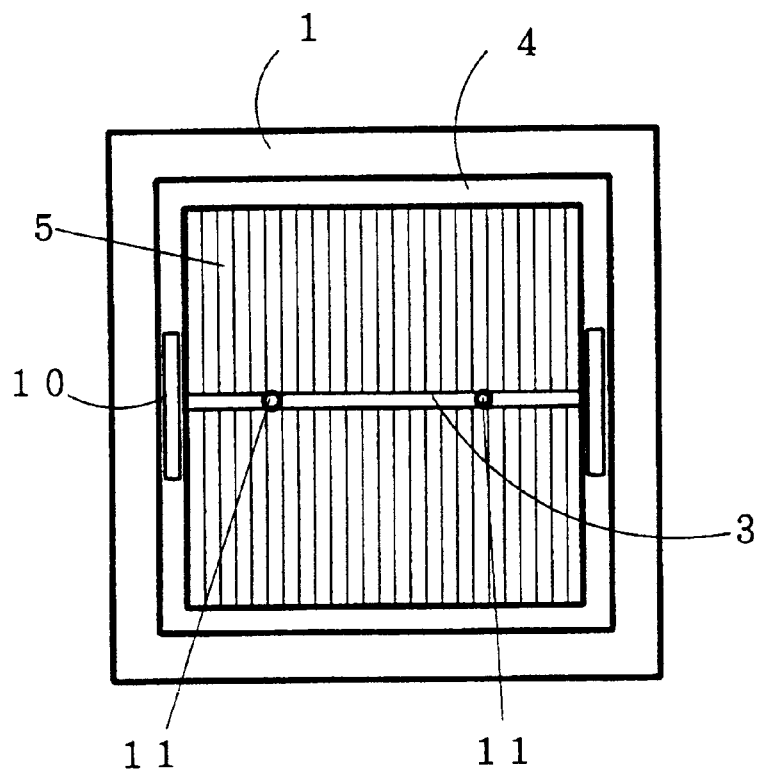
FIGS. 2a, 2b, 3a and 3b show plane views and sectional views of the injection mold according to other embodiments of the present invention.
Figure 2B:
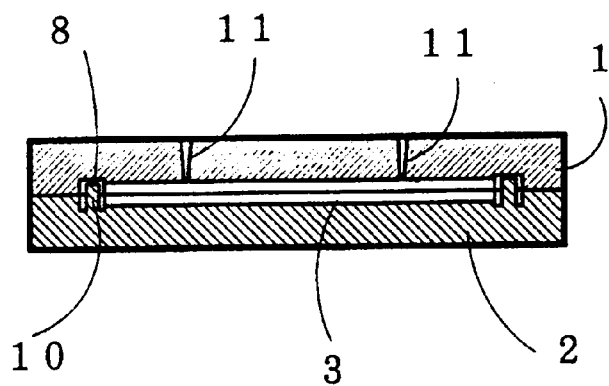

FIG. 2a is a plane view of the mold having a bypass wall 10 together with the pin point gate 11 which has a large diameter. FIG. 2b is a sectional view of the mold in which each passage groove 3 for the upper mold 1 and the lower mold 2 is symmetrically formed with the same groove width and the same groove depth.

In other words, FIGS. 2a and 2b show the structure wherein a wall is provided such that the entrance of the molten resin to the frame groove is halted by the wall, thereby effecting the preferential entrance of the resin to the fine grooves and preventing missing of the net portions.

Figure 3A:
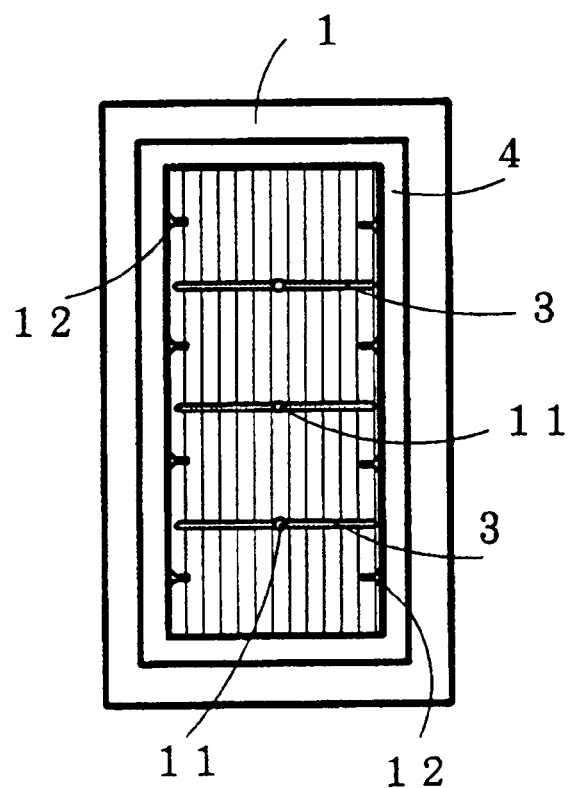
Figure 3B:
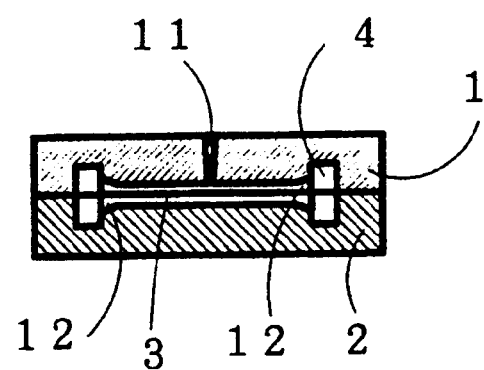

FIG. 3a is a plane view of the mold in which the band-shaped groove 12 is formed in communication with the frame groove 4 of the upper mold 1. FIG. 3b is a sectional view of the mold in which each passage groove 3 for the upper mold 1 and the lower mold 2 is symmetrically formed with the same groove width and the same groove depth. The band-shaped groove 12 has a depth which is gradually lower toward the center from the frame groove 4, so as to prevent the molten resin from the frame groove 4 from entering into the net groove 5 to excess. In case of no band-shaped groove 12, it is likely to generate burr at the middle portion of the net groove 5.

Figure 4A:
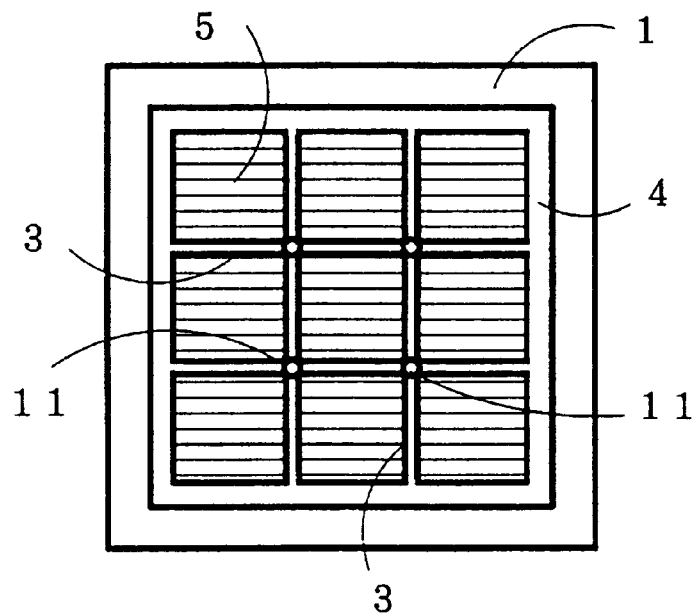
FIGS. 4a, 4b, 5a, 5b, 6a, 6b, 7a, 7b, 8a, 8b, 9a, 9b, 10a and 10b show plane views of the injection mold according to other embodiments of the present invention.

FIG. 4a is a plane view of the upper mold 1. Referring to FIG. 4a, a plurality of passage grooves 3 having a large diameter are formed to be communicate with the frame groove 4, and a plurality of pin point gates 11 having a large diameter are formed on the crossing point of the passage grooves 3.

Figure 4B:
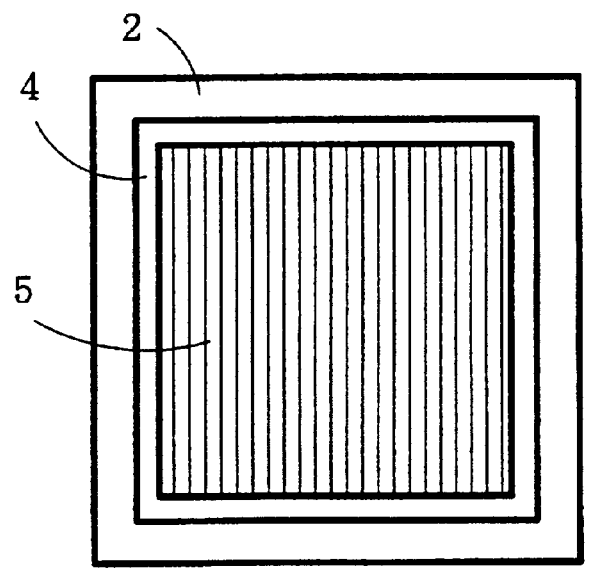

FIG. 4b is a plane view of the lower mold 2. Referring to FIG. 4b, the frame groove 4 is formed to surround the net groove 5. The frame groove 4 may be formed only in one direction of the upper mold 1 or the lower mold 2 according to the specific application. In addition, this embodiment is characterized in that the passage groove 3 is not formed in the lower mold 2. If the passage groove 3 is formed in one side, there is an advantage that the molten resin can flow smoothly without any collision.

Figure 5A:
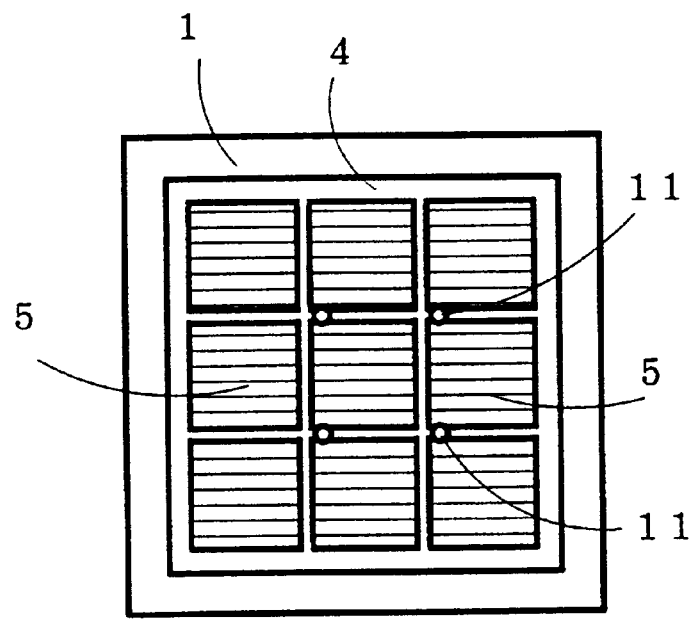
Figure 5B:
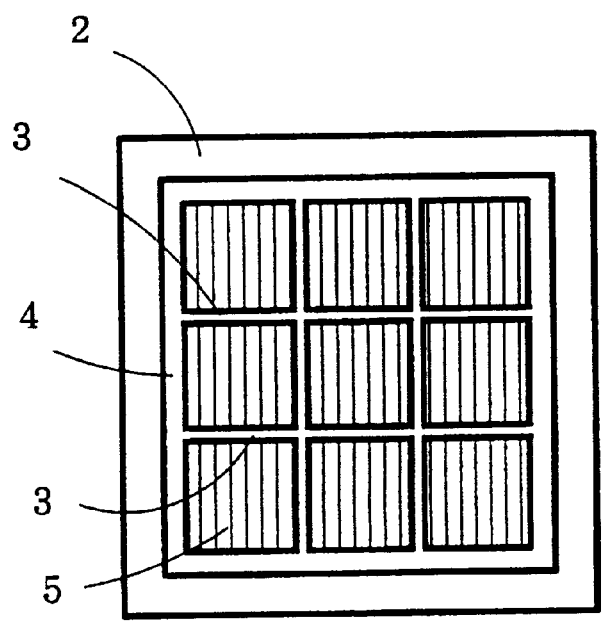

FIGS. 5a and 5b show the structure in which the passage grooves 3 are formed in both the upper mold 1 and the lower mold 2, and the pin point gate 11 is formed to be apart from the crossing point of the passage grooves 3. If the gate is formed on the crossing point, it is likely that the molten resin will flow into the frame groove 4 rapidly. Thus, the molten resin is concentrated into the middle portion of the net groove 5, so that it is likely to generate burrs at the middle portion. To prevent the molten resin from flowing rapidly, the gate is formed in a portion where the molten resin fails to flow smoothly. In this case, it is preferable that the passage groove 3 is symmetrically formed in the upper mold 1 and the lower mold 2 so as to uniformly allow reaching of the molten resin to the end of the net groove 5 without increasing injection pressure.

Figure 6A:
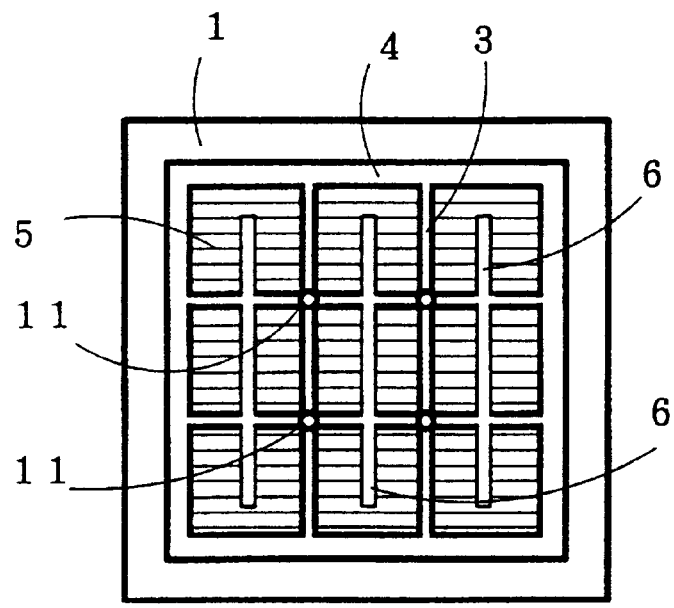
Figure 6B:
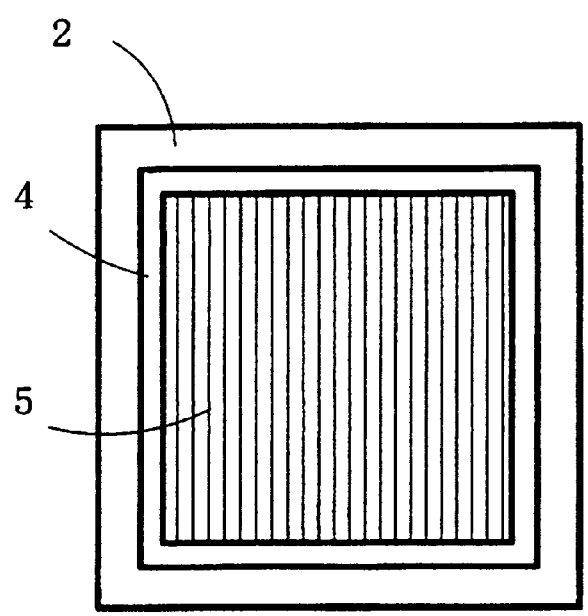

FIG. 6a shows the structure in which a plurality of passage grooves 3 are formed and a plurality of pin point gates 11 having a large diameter are formed on the crossing point of the passage grooves 3. FIG. 6b shows a plane view of the lower mold 2 in which the frame groove 4 is formed to surround the net groove 5 and the passage groove 3 is not formed in the lower mold 2.

Since the passage groove 3 having a large diameter is formed in the upper mold 1, to communicate with the frame groove 4, the molten resin flows into the frame groove 4 smoothly. Since a guide groove 6 having a large diameter or a large width is formed and is not in direct communication with the frame groove 4 (but is by combination with the passage groove 3), the molten resin is not directly connected to the frame groove 4. Thus, the molten resin is inserted into the net groove 5 by pressure, which communicates with the side of the frame groove 4, after a constant pressure is collected in the frame groove 4, so that the molten resin certainly flows into the end of the net groove 5. As a result, a molded article which requires a fine net can be molded by low pressure molding methods.

Further, since the passage groove 3 is not formed in the lower mold 2, the molten resin does not come into collision with the passage groove 3 of the upper mold 1. Thus, the molten resin can enter into the frame groove 4 smoothly, and flowability of the molten resin to the center of the net groove 5 can be improved, so that missing ribs do not occur in the middle portion.

Figure 7A:
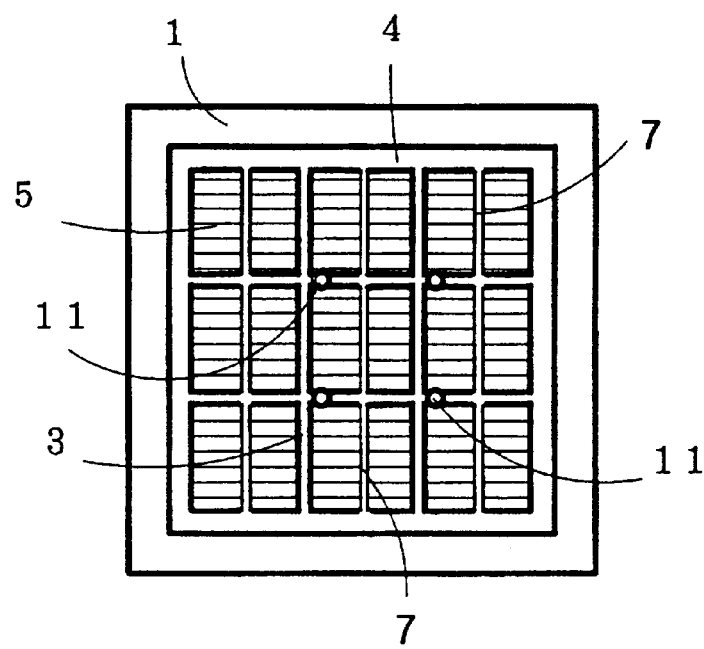
Figure 7B:
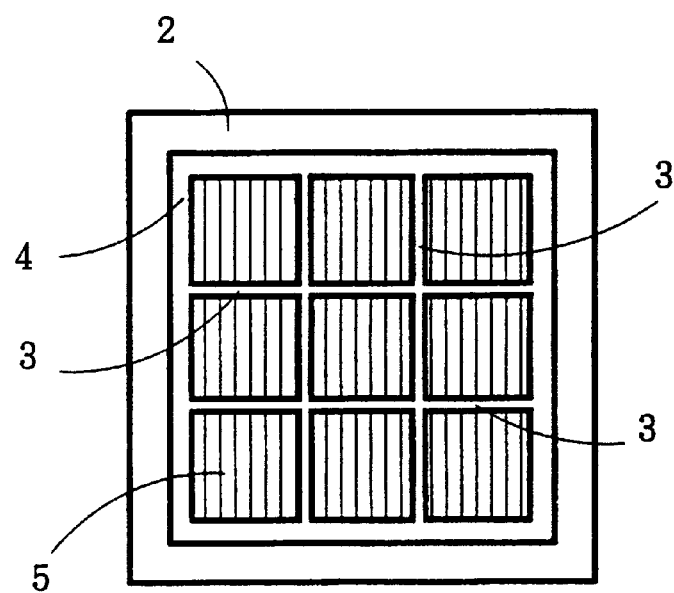

FIGS. 7a and 7b show the other modified embodiment in which the molten resin flows into the frame groove 4 more smoothly to improve flowability of the molten resin to the center of the net groove 5, so as not to cause missing ribs in the middle portion.

As shown in FIG. 7a, the passage groove 3 in which the pin point gate 11 is formed is formed in the upper mold 1, and at the same time the passage groove 3, which serves as a main trunk line passage, is formed in lower mold 2 to be symmetrical with the passage groove 3 in the upper mold 1 as shown in FIG. 7b. An auxiliary passage groove 7 having a thin width is formed between the main trunk line passage groove (which has a large diameter). The auxiliary passage groove 7 allows the molten resin to flow into the net groove 5. In particular, it is effective to mold a striped net. In the case of a striped net, since the net groove 5 is cut only in one direction, flow of the molten resin becomes weakened so that missing ribs occur. The auxiliary passage groove 7 serves to solve this problem. Also, the pin point gate 11 formed in the passage groove 3 is not formed on the crossing point of the plurality of passage grooves 3 but is formed to be slightly apart from the crossing point. If the pin point gate 11 is formed on the crossing point of the passage grooves 3, the molten resin flows smoothly so that flowability of the molten resin to the center of the net groove 5 is improved. This results in a problem that burrs occur in the middle portion. For example, this problem occurs when the material of the molten resin is changed to a material having a high flowability. If the pin point gate 11 is formed in a portion other than the crossing point of the passage groove 3, the molten resin is prevented from flowing too smoothly and burrs are prevented from being generated in the middle portion of the net groove 5.

Figure 8A:
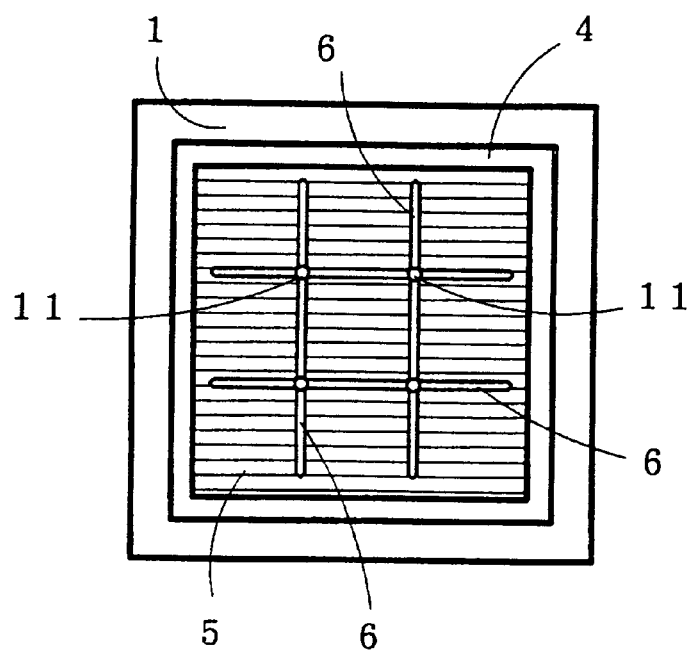
Figure 8B:
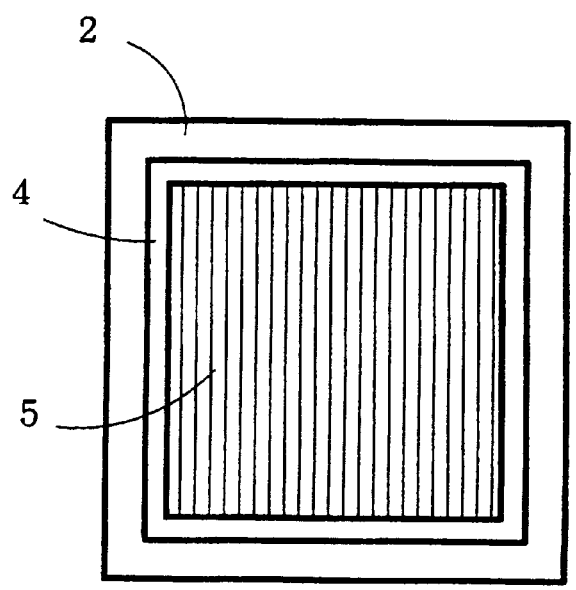

FIG. 8 shows the other modified embodiment in which only a guide groove 6 is formed. Conventionally, although inventions directed to the guide groove 6 have been applied, in the present invention, the guide groove 6 is applied to the pin point gate having a large diameter. As shown in FIG. 8a, a plurality of guide grooves 6 are formed in the upper mold 1 so as to intersect with one another. The pin point gate 11, having a large diameter, is formed on the crossing point of the guide grooves 6. This embodiment is effective in the case of increasing of aperture of the net. In this embodiment, it is intended that an occupied area of the passage groove having a large diameter or the guide groove is small. FIG. 8b shows the structure in which the passage groove or the guide groove is not formed and the molten resin from the guide groove 6 of the upper mold 1 flows smoothly.

Figure 9A:
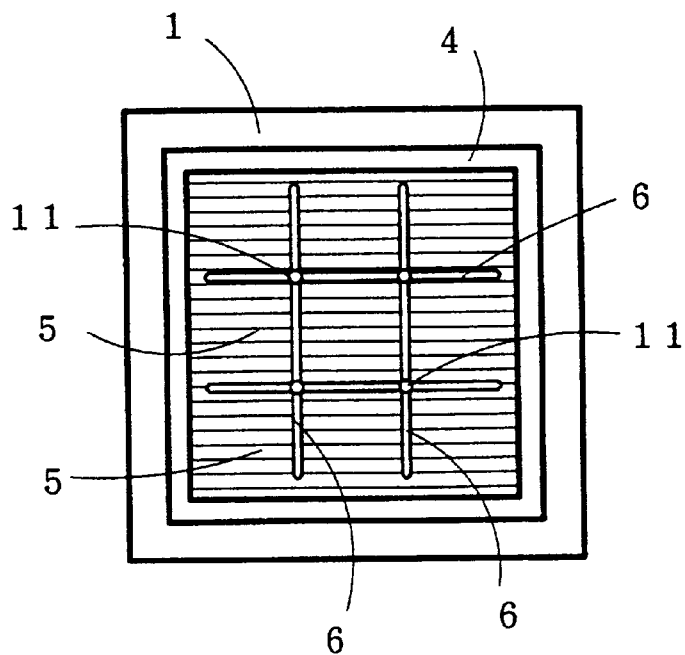
Figure 9B:
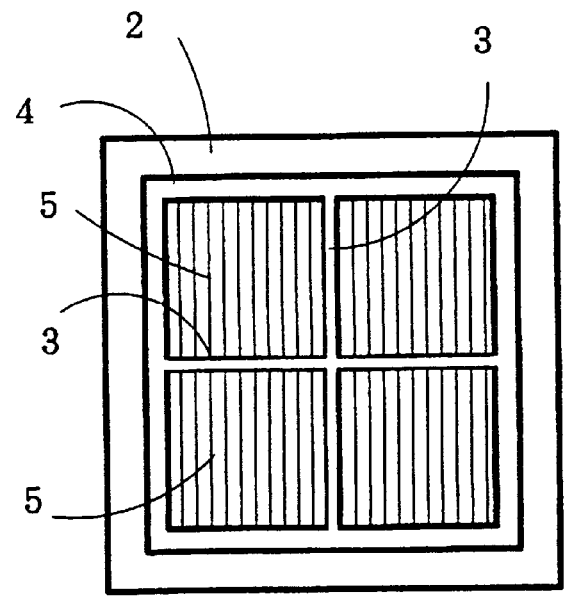

FIG. 9a shows the structure in which a plurality of guide grooves 6 are formed in the upper mold 1, to intersect with one another, and the pin point gate 11 having a large diameter is formed on the crossing point of the guide grooves 6. As shown in FIG. 9b, a cross-shaped passage groove 3 having a large diameter is formed in the lower mold 2. The passage groove 3 having a large diameter is formed so as not to overlap the guide grooves 6. Thus, the molten resin from the guide grooves 6 of the upper mold 1 flows smoothly. In addition, the molten resin smoothly flows into the frame groove 4 by the passage groove of the lower mold 2, so that flowability required for the formation of the net is improved.

Figure 10A:
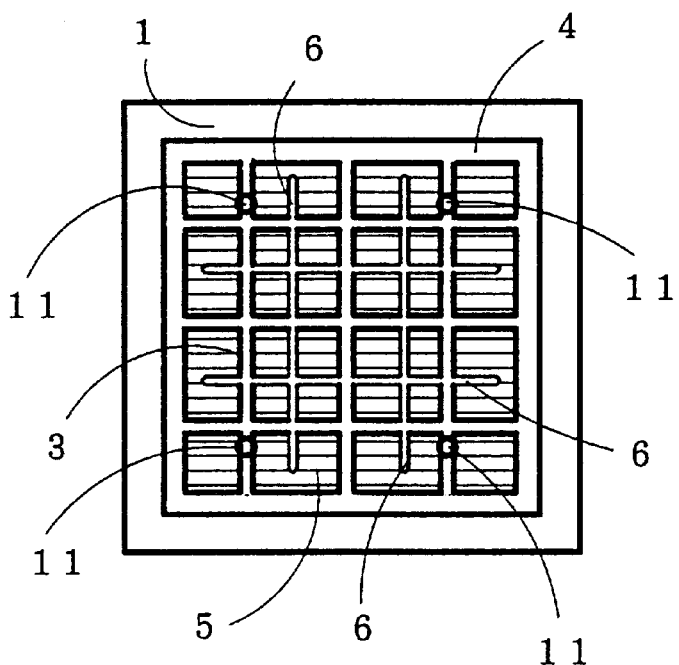
Figure 10B:
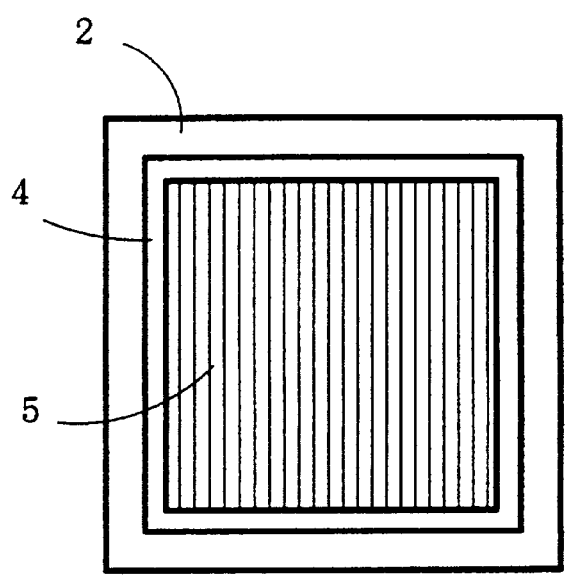

In the same manner as FIG. 6a, FIG. 10a shows the structure in which a guide groove 6 having a large diameter or a large width is formed to be not directly communicating with the frame groove 4 (communication is provided by combination with the passage groove 3). In this embodiment, the guide groove 6 is not directly connected to the frame groove 4. Thus, the molten resin is inserted into the net groove 5 by pressure, which is communicated with the side of the frame groove 4, after a constant pressure is collected in the frame groove 4, so that the molten resin certainly flows into the end of the net groove 5. Further, the pin point gate 11 formed in the passage grooves 3 is not formed on the crossing point of the passage grooves 3 but is formed to be slightly apart from the crossing point. If the pin point gate 11 is formed on the crossing point of the passage groove 3, the molten resin flows too smoothly so that flowability of the molten resin to the center of the net groove 5 is improved. This results in a problem that burrs occur in the middle portion. For example, this problem occurs when the material of the molten resin is changed to a material having a high flowability. If the pin point gate 11 is formed in a portion other than the crossing point of the passage groove 3, the molten resin is prevented from flowing too smoothly and burrs are prevented from being generated in the middle portion of the net groove 5. However, unlike FIG. 7a, this embodiment is characterized in that the pin point gate 11, formed to be slightly apart from the crossing point of the passage grooves 3, is formed on the passage groove 3 close to the frame groove 4, so as to prevent the molten resin from flowing too smoothly into the center of the filter. The other passage groove serves to prevent the molten resin from flowing into the center, so that burrs can be prevented from occurring in the middle portion of the net groove 5. FIG. 10b shows the structure in which the passage groove or the guide groove is not formed in the lower mold 2 and the molten resin from the passage groove or the guide groove 6 of the upper mold 1 flows smoothly. In this embodiment, turbulent flow of the molten resin can be avoided.

As described above, in the present invention, since the diameter of the pin point gate is 1.5 $\phi$ or more, the molten resin in the mold can smoothly flow in spite of low pressure mold and the large-sized one-piece mold plastic filter can be manufactured.

Accordingly, since the diameter of the pin point gate formed on the passage groove is b 1.5$\phi$ or more, effects of the present invention are that mass production of the molded articles having a large area or the molded articles composed of a fine net becomes possible, even in the case of low injection pressure, low fitting power, and short molding time.

Also, according to aspects of the invention, the passage groove has a cross shape and the pin point gate is formed on the crossing point of the passage groove. The passage groove has the diameter or width relative to the diameter of the pin point gate. In addition, the passage groove is formed as a guide groove having a large diameter or a large width, both ends of which are not directly connected to the frame groove. Thus, flow or flowability of the molten resin in the mold can be improved significantly.

According to further aspects of the invention, since the band-shaped groove having a large diameter or a large width is formed in a direction intersecting the passage groove, flowability of the molten resin toward the net from the frame groove can be improved.

According to another aspect of the invention, at least one bypass wall groove is formed on the frame groove of the upper mold and/or the lower mold to bypass flow of the molten resin from the passage groove and is formed to oppose the passage groove. Thus, the molten resin will not directly flow into the frame groove having a large width, but flows into the fine groove so that missing ribs in the net can be avoided.

According to a further aspect, since the band-shaped groove protrudes to communicate with the frame groove in a direction toward the gate from the frame groove, the depth of which is gradually formed to be lower toward the center of the mold, the net can be formed without rapidly increasing flowability of the molten resin which flows into the net from the frame groove.

In accordance with further aspects, in order to enable flow of the molten resin into the fine groove after the molten resin is accumulated by pressure, a plurality of band-shaped grooves having a large diameter or a large width, both ends of which are not directly connected to the frame groove are formed. Thus, nets can certainly be formed. In other words, it is possible for the molten resin to flow into the end of the net groove, and a molded article which requires a fine net can be molded at low mold pressure.

According to yet a further aspect, the passage groove having a large diameter or a large width is formed only in one direction on the net groove of the upper mold or the lower mold. Thus, it is possible to prevent turbulent flow of the molten resin between the passage grooves from being generated and improve flowability of the molten resin significantly.

Still according to another aspect, at least one gate is formed on the passage groove to inject the molten resin into the mold and is formed to be slightly apart from the crossing point of the passage grooves. Thus, it is possible to prevent the molten resin from flowing too smoothly and prevent burrs from occurring at the center of the net groove.

According to an aspect of the invention, a gate is formed to be slightly apart from the crossing point of the passage groove, formed on the passage groove close to the frame groove. Thus, it is possible to prevent the molten resin from flowing into the center of the filter too smoothly. Also, the other passage groove prevents the molten resin from flowing into the center of the filter, so that it is possible to prevent burrs from occurring at the center of the net.

Also according to the invention, molded articles are formed by the various aspects of the injection molding apparatus so a molded article which is fine and has good yield can be obtained.

While the invention has been described in its preferred embodiments, it is to be understood that many variations of such embodiments exist. Such variations are intended to be within the scope of the present invention and the appended claims.

What is claimed is:

1. An injection molding apparatus for molding a plastic article by fitting an upper mold and a lower mold by pressing and injecting a molten resin through a pin point gate, comprising:
   (a) a net groove formed at the upper mold and/or the lower mold, said net groove comprising fine grooves extending in a vertical and/or horizontal direction, wherein the net groove at the upper and lower mold are formed in the same directions;
   (b) a passage groove having a large diameter or a large width, for facilitating the entrance of the molten resin, the passage groove being formed on the net groove of the upper mold and/or the lower mold;
   (c) at least one pin point gate formed on the passage groove to inject the molten resin into the mold, having a diameter of 1.5 $\phi$ or more to be suitable for a shape or size of the plastic article; and
   (d) a frame groove formed to surround the net groove in the upper mold and/or the lower mold.

2. The injection molding apparatus as claimed in claim 1, wherein the passage groove has a cross shape and the pin point gate is formed on a crossing point of the passage groove.

3. The injection molding apparatus as claimed in claim 1, wherein the passage groove has the same diameter or width as the diameter of the pin point gate.

4. The injection molding apparatus as claimed in claim 1, wherein the passage groove is formed as a guide groove having a large diameter or a large width, both ends of which are not directly connected to the frame groove, in order that the molten resin injected into the mold through the pin point gate can be entered into the fine groove after the pressure of the molten resin is accumulated.

5. An injection molding apparatus for molding a plastic article by fitting an upper mold and a lower mold by pressing and injecting a molten resin through a pin point gate, comprising:

(a) a net groove formed at the upper mold and/or the lower mold, said net groove comprising fine grooves extending in a vertical and/or horizontal direction;

(b) a passage groove having a large diameter or a large width, for facilitating the entrance of the molten resin, the passage groove being formed on the net groove of the upper mold and/or the lower mold;

(c) at least one pin point gate formed on the passage groove to inject the molten resin into the mold, having a diameter of 1.5 φ or more to be suitable for a shape or size of the plastic article; and (d) a frame groove formed to surround the net groove in the upper mold and/or the lower mold, wherein a band-shaped groove having a large diameter or a large width is formed in a direction intersecting the passage groove, in order that the molten resin injected into the mold through the gate can be entered into the net groove in a wide range after the pressure of the molten resin is accumulated.

6. An injection molding apparatus for molding a plastic article by fitting an upper mold and a lower mold by pressing and injecting a molten resin through a pin point gate, comprising:

(a) a net groove formed at the upper mold and/or the lower mold, said net groove comprising fine grooves extending in a vertical and/or horizontal direction;

(b) a passage groove having a large diameter or a large width, for facilitating the entrance of the molten resin, the passage groove being formed on the net groove of the upper mold and/or the lower mold;

(c) at least one pin point gate formed on the passage groove to inject the molten resin into the mold, having a diameter of 1.5 φ or more to be suitable for a shape or size of the plastic article; and (d) a frame groove formed to surround the net groove in the upper mold and/or the lower mold, wherein at least one bypass wall groove is formed on the frame groove of the upper mold and/or the lower mold to oppose the passage groove, in order that the flow of the molten resin from the passage groove can be bypassed.

7. An injection molding apparatus for molding a plastic article by fitting an upper mold and a lower mold by pressing and injecting a molten resin through a gate, comprising:

(a) a net groove formed at the upper mold and/or the lower mold, said net groove comprising fine grooves extending in a vertical and/or horizontal direction;

(b) a passage groove having a large diameter or a large width, for facilitating the entrance of the molten resin, the passage groove being formed on the net groove of the upper mold and/or the lower mold;

(c) at least one gate formed on the passage groove, for injecting the molten resin into the mold;

(d) a frame groove formed to surround the net groove in the upper mold and/or the lower mold; and (e) a band-shaped groove protruded to be communicated with the frame groove in a direction toward the gate from the frame groove, the depth of which being gradually formed to be low toward the center of the mold.

8. An injection molding apparatus for molding a plastic article by fitting an upper mold and a lower mold by pressing and injecting a molten resin through a gate, comprising:

(a) a net groove formed at the upper mold and/or the lower mold, said net groove comprising fine grooves extending in a vertical and/or horizontal direction;

(b) a passage groove having a large diameter or a large width, for facilitating the entrance of the molten resin, the passage groove being formed on the net groove of the upper mold and/or the lower mold;

(c) at least one gate formed on the passage groove, for injecting the molten resin into the mold;

(d) a frame groove formed to surround the net groove in the upper mold and/or the lower mold; and (e) a plurality of guide grooves formed at at least one of the upper mold or the lower mold, having a large diameter or a large width, both ends of which are not directly connected to the frame groove, formed in rectangular or cross-rectangular direction, in order that the molten resin injected into the mold through the gate can be entered into the fine groove after the pressure of the molten resin is accumulated.

9. An injection molding apparatus for molding a plastic article by fitting an upper mold and a lower mold by pressing and injecting a molten resin through a gate, comprising:

(a) a net groove formed at the upper mold and/or the lower mold, said net groove comprising fine grooves extending in a vertical and/or horizontal direction, wherein the net groove at the upper and lower mold are formed in the same directions;

(b) a passage groove having a large diameter or a large width, for facilitating the entrance of the molten resin, the passage groove being formed only in one direction on the net groove of the upper mold and/or the lower mold;

(c) at least one gate formed on the passage groove, for injecting the molten resin into the mold; and (d) a frame groove formed to surround the net groove in the upper mold and/or the lower mold.

10. An injection molding apparatus for molding a plastic article by fitting an upper mold and a lower mold by pressing and injecting a molten resin through a gate, comprising:

(a) a net groove formed at the upper mold and/or the lower mold, said net groove comprising fine grooves extending in a vertical and/or horizontal direction, wherein the net grooves at the upper and lower mold are formed in the same directions;

(b) a passage groove having a large diameter or a large width, for facilitating the entrance of the molten resin, the passage groove being formed on the net groove of the upper mold and/or the lower mold;

(c) at least one gate formed on the passage groove, for injecting the molten resin into the mold; and (d) a frame groove formed to surround the net groove in the upper mold and/or the lower mold.

11. The injection molding apparatus as claimed in claim 10, wherein the gate formed to be slightly apart from the crossing point of the passage groove is formed on the passage groove close to the frame groove.

* * * * *